United States Patent Office 2,958,236
Patented Nov. 1, 1960

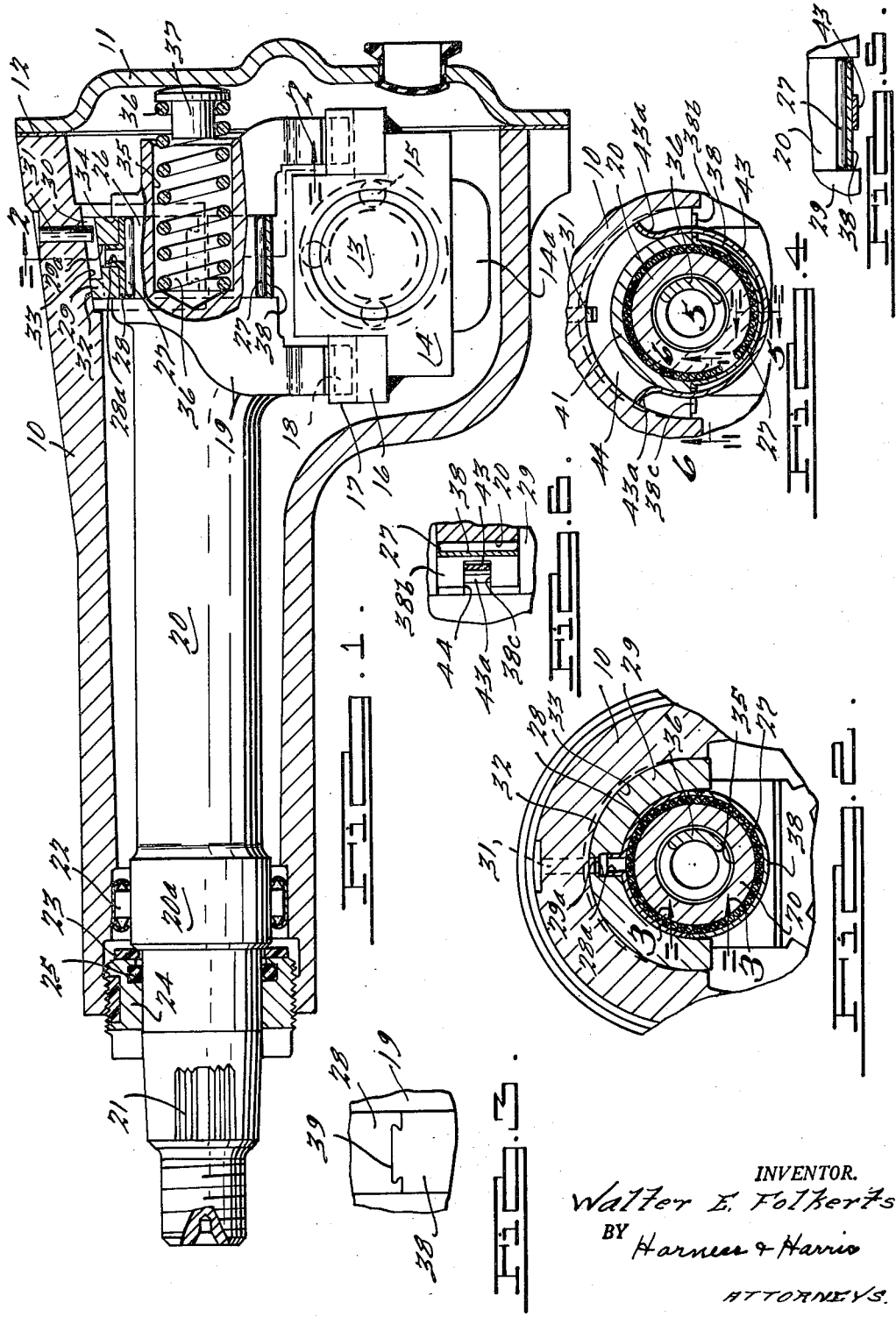

2,958,236

VEHICLE STEERING MECHANISM

Walter E. Folkerts, Hazel Park, Mich., assignor to Chrysler Corporation, Highland Park, Mich., a corporation of Delaware Filed Nov. 23, 1959, Ser. No. 854,853

19 Claims. (Cl. 74—499)

This invention relates to vehicle steering mechanisms particularly of the ball-nut and lever type wherein the ball-nut is engaged with a worm shaft to ride axially along the latter upon rotation of the work shaft under the manual control of the vehicle operator.

In one type of such a construction, two gear racks extending axially of the worm at opposite sides of the nut are carried by the latter and engage a pair of spaced sector gears which extend radially from a rockshaft. The latter extends transversely of the worm and is operatively connected with a steering gear for turning the vehicle's dirigible wheels when axial movement of the ball-nut along the worm causes pivoting of the rockshaft in one direction or the opposite in consequence of the connection between the ball-nut and rockshaft.

In such a construction the reaction of the steering force between the teeth of the gear racks and sector gears imparts a thrust radially against one side of the rockshaft. This thrust in turn is carried by suitable bearings which journal the rockshaft. It has been customary heretofore to provide a cantilever bearing support for the sector gear of the rockshaft by means of a set of needle bearings at one side of the sector gears, or to provide a pair of needle bearing sets for the rockshaft at opposite sides of the sector gears. The latter situation necessitates axial extensions of the rockshaft in opposite directions from the sector gears and thus increases the cost and bulkiness of the steering unit and renders the same unsuitable where compactness is critical. In either situation, the bearing support for the rockshaft is not at the location of maximum load, so that the increased leverage acting against the bearing support and the tendency for uneven wear must be compensated for by a stronger and more costly structure.

An object of the present invention is to provide an improved simplified and economically manufactured segmental bearing structure for a rockshaft comprising an annular recirculating set of needle bearings arranged to support the rockshaft at the region of optimum steering load and to avoid the necessity of a cantilever structure at the region of the rockshaft subject to maximum load, or of bridging this region between two bearing sets.

A more specific object is to provide such a structure wherein a set of needle bearings extending axially of the rockshaft are arranged around the region of the latter that most closely crosses the worm shaft. The needle bearings in a portion of the bearing set at the side of the rockshaft which receives the thrust of the steering load are confined between segmental bearing surfaces of the rockshaft and a bearing collar in bearing engagement with these surfaces. A segmental guide loosely confines the remaining needle bearings and serves to guide recirculation thereof around the rockshaft when the latter is pivoted in a steering operation.

Another object is to provide such a structure wherein the segmental bearing surface of the rockshaft is formed on an axial portion thereof spacing a pair of radially extending sector gears carried by the rockshaft. The sector gears mesh with gear racks carried by the worm driven nut, the gear racks extending at opposite sides of the worm and parallel to the axis thereof and transversely to the axis of the rockshaft. Thus the steering load is feasibly distributed uniformly between a pair of sector gears spaced by the worm driven nut, whereby the spacing between the axis of the rockshaft and nut is minimized and a compact unit is enabled.

Still another object is to provide an improved structure of the above character wherein the outer periphery of the bearing collar and the housing for the worm and rockshaft have mating surfaces inclined with respect to the axis of the rockshaft to cam the sector gears of the rockshaft snugly into mesh with the gear racks upon axial adjustment of the rockshaft, thereby to provide simple effective means for minimizing play between the meshed gear teeth and at the same time to employ the housing most effectively as a backing or reinforcement for the segmental bearing collar so as to enable the latter to resist the thrust against the rockshaft during steering operations.

Other objects of this invention will appear in the following description and appended claims, reference being had to the accompanying drawings forming a part of this specification wherein like reference characters designate corresponding parts in the several views.

Figure 1 is a sectional view taken longitudinally of the rockshaft and transversely of the manually operated worm shaft of a vehicle steering gear.

Figure 2 is a fragmentary sectional view taken in the direction of the arrows substantially along the line 2—2 of Figure 1.

Figure 3 is a fragmentary elevational view of the juncture between the bushing and needle bearing guide for the rockshaft, taken in the direction of the arrows 3—3 of Figure 2.

Figure 4 is a view similar to Figure 2, but showing a modified construction.

Figure 5 is a fragmentary sectional view taken in the direction of the arrows substantially along the line 5—5 of Figure 4.

Figure 6 is a fragmentary sectional view taken in the direction of the arrows substantially along the line 6—6 of Figure 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring in more particularity to Figures 1–3, an embodiment of the present invention is illustrated by way of example comprising an outer housing 10 which is suitably secured to the vehicle chassis. A tubular portion of the housing 10 is illustrated which is closed at one end by a closure plate 11 spaced from the housing 10 by a gasket 12 and secured to the housing 10, as for example by suitable bolts not shown. Journalled within the housing 10 is a helically grooved worm shaft 13 operably connected with the vehicle steering wheel for manual control by the operator.

A nut 14 having a helically grooved interior mating with the helical grooves of the worm shaft rides axially along and is connected with the latter by a plurality of recirculating balls 15 in the mating grooves of the worm 13 and nut 14. Recirculation of the balls 15 to confine the latter within the limits of the nut 14 may be accomplished by means of a typical ball crossover tunnel 14a which communicates with the mating helical grooves adjacent opposite ends of the nut 14 to receive and discharge the balls 15 in accordance with relative rotation between the worm 13 and nut 14. If desired, a conventional power actuated follow-up type servo mechanism may be employed to assist manual control of the worm shaft during steering. The structure thus far may be conventional and is accordingly not described in further detail.

Secured to opposite sides of the nut 14 and extending axially of the worm 13 are two gear racks 16, each having upwardly directed gear teeth 17 which mate with teeth 18 at the lower ends of a pair of swinging arms or sector gears 19. The latter are integral with a rockshaft 20 having its axis perpendicular to the axis of the worm 13 and extending leftward from the arms 19 through the housing 10 for attachment at 21 with the vehicle steering linkage. The left end of rockshaft 20 is provided with an enlarged annular bearing surface 20a journalled within the housing 10 by means of an annular set of needle bearings 22. A wear washer 23 abuts the outer shoulder of the annular enlargement 20a and is secured in position by a nut 24 screwed into the left end of housing 10. A conventional annular dirt seal 25 is carried by the nut 24 leftward of the washer 23.

At the region of the rockshaft 20 where the latter's axis passes in closest proximity to the axis of the worm 13, a circular cylindrical bearing surface 26 of the rockshaft 20 is located centrally between the arms 19. The bearing surface 26 need extend below the lower half of the rockshaft 20 only to the extent required by the latter's pivotal motion as explained below. The portion of the rockshaft 20 below the bearing surface 26 need not be provided with a bearing finish but is reasonably smooth. In the present instance, this portion of the rockshaft 20 below the bearing surface 26 is a circular cylindrical continuation of the surface 26, Figure 2, although this lower surface portion may have an elliptical or other cylindrical shape in accordance with production or spatial requirements, as will be apparent from the following.

Extending axially of the shaft 20 and arranged around the latter at the region of the bearing surface 26 is an annular set of needle bearings 27. A segmental collar structure including a segmental circularly cylindrical bushing 28 and rigid backing collar 29 confine the needle bearings 27 around the upper half of shaft 20, with the bushing 28 in bearing contact with the bearings 27. The collar 29 is provided with a radial bore 29a located centrally in its upper portion to receive a tubular offset portion 28a of bushing 28, whereby the latter and collar 29 are keyed together. Also extending axially in the upper portion of collar 29 is a slot 30 into which the lower end of a key 31 closely fits, Figure 1. The upper end of key 31 is secured within the housing 10 to prevent rotational movement of collar 29 and bushing 28.

As illustrated in Figure 2, the bushing 28 extends in opposite directions from the offset 28a so as to enclose slightly more than the upper half of the circumference of the annular set of needle bearings 27. The inner surface of the reinforcing collar 29 extends circularly around the bushing 28 to reinforce and hold the latter in bearing contact with the needle bearings 27. The lower ends of collar 29 extend slightly beyond the lower ends of bushing 28 in planes parallel to the latter's axial plane of symmetry.

The outer cylindrical surface 32 of the collar 29 is formed on a bias with respect to the axis of rockshaft 20, as illustrated in Figures 1 and 2, and mates with a correspondingly biased cylindrical surface 33 on the interior of housing 10 to cam collar 29 downwardly toward the upper bearing surface 26 and thereby to urge the sector teeth 18 snugly into mesh with the teeth 17 of the gear racks 16 upon leftward movement of shaft 20 in Figure 1. Specifically, the mating cylindrical surfaces 32 and 33 are formed about an axis which intersects the axis of shaft 20 at a small angle of preferably less than 10° and which lies in the axial plane of symmetry of sector gear 19 when the latter is in the straight-ahead steering position illustrated. Radial enlargements 34 of the arms 19 at opposite ends of the collar 29 retain the latter, bushing 28, and needle bearings 27 in position.

In order to urge the rockshaft 20 yieldingly leftward, a coaxial bore 35 provided in its right end contains a coil spring 36 seated under compression between the base of the bore 35 and an outer spring retainer 37 which in turn is seated against the end closure plate 11. Adjustment of the axial position of rockshaft 20 is accomplished by adjusting nut 24 until the desired pressure between the gear teeth 17 and 18 is obtained. The material of wear washer 23 is determined so that the latter, subject to the force of spring 36, will wear at a rate corresponding to the wear of the aforesaid gear teeth. In consequence, as these elements wear, spring 36 will shift rockshaft 20 leftward, thereby to cam the latter downwardly toward the gear racks 16 and minimize play or backlash in the mechanism substantially throughout its operating life.

In order to enable pivotal steering motion of the rockshaft 20 and to obtain circulation of the needle bearings 27 around the bearing surface 26 during such pivotal motion, a segmental bearing guide 38 is provided around the under side of the bearings 27 in Figures 1 and 2. In the present instance the guide 38 is circularly cylindrical in order to conform to the circular sectional shape of the under side of rockshaft 20. However if the under side of the rockshaft 20 at the region of the needle bearings 27 is formed with any other cylindrical shape, guide 38 will be correspondingly shaped so as to loosely confine the bearings 27 against the under side of the rockshaft 20. In this connection, inasmuch as the thrust of the steering movement directed against the sector gear teeth 18 is upward in Figures 1 and 2, this thrust is received by the bushing 28 above the rockshaft. The bearings 27 at the under side of the rockshaft need not be maintained in bearing contact therewith by the loosely fitting guide 38, so that appreciable economies in structure are obtained. The upper ends of the guide 38 are suitably connected with the depending lower ends of bushing 28, as for example by the dove-tailed connection illustrated in Figure 3.

As is apparent from the structure described, the reaction thrust of the steering movement between worm 13 and rockshaft 20 will be directed upwardly through the gear racks 16 to the sector gears 19 and thence through the needle bearings 27 at the upper portion of the rockshaft 20 containing the bearing surface 26. This thrust is taken by the bushing 28 reinforced by collar 29, which in turn seats against the cylindrical surface 33 of housing 10. The structure disclosed comprising the paired swinging arms 19 at the opposite sides of the worm 13 not only balances the steering load at opposite sides of the nut 14 and prevents the latter from rotating around the axis of worm shaft 13, but enables the latter to pass comparatively closely to the axis of shaft 20, thereby achieving optimum compactness of structure.

By virtue of the separable guide 38 loosely confining the needle bearings 27 at the lower portion of the rockshaft 20, the bearings 27 are enabled to recirculate around the upper load bearing portion of the rockshaft 20 during steering movement. Not only is economy obtained in the manufacture of the bearing surface 26 by eliminating the necessity of close tolerances between the guide 38 and bearings 27, but the structure shown provides bearing support for the shaft 20 directly in opposition to the thrust of worm shaft 13 without the necessity of a cantilevered bearing support for shaft 20 or the provision of a bearing support for the latter rightward of the swinging arms 19.

Figures 4, 5, and 6 illustrate a modification of the present invention which is similar in construction and operation to that of Figures 1–3. Corresponding parts are accordingly numbered the same in all views. In Figure 4 instead of the separate bushing 28 and collar 29, a unitary segmental collar 41 is employed having an inner bearing surface in bearing engagement with the needle bearings 27 and corresponding to the bushing 28 of Figure 2. The outer cylindrical surface of the collar 41 is formed on a bias with respect to the axis of shaft 20 in the manner of the surface 32 of collar 29 and mates with the biased surface 33 of housing 10.

In Figure 4, instead of securing the ends of the lower guide 38 to a bushing 28, the upper ends of guide 38 are flared outwardly at 38b so as to underlie and seat closely against the lower ends of segmental collar 41 slightly below the horizontal mid-plane of the shaft 20 in Figure 4. Accordingly the lower ends of collar 41 terminate at said mid-plane, inasmuch as they need not extend tangentially to the inner bearing surface at said mid-plane, as in Figure 2. As illustrated in Figures 4 and 5, the loosely fitting guide 38 is retained in position by a C-shaped spring clip 43 having outwardly turned ends 43a confined within a circumferentially extending groove 44 in the outer surface of collar 41. The upper portions of spring clip 43 pass through endwise opening notches 38c in flanges 38b and maintain guide 38 in position with respect to needle bearings 27 by contact with the flanges 38b at the bases of the notches 38c. It is to be noted that key 31 is offset from the vertical mid-plane of collar 41, in the manner indicated in Figure 1, so as not to enter groove 44. In other respects, the operation and advantages of the structure illustrated in Figures 4–6 are the same as in Figures 1–3.

I claim:

1. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, said rockshaft having a bearing surface between said arms, a set of roller bearings disposed around said rockshaft between said arms and engaging said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position.

2. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position.

3. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position.

4. In a steering gear, a worm, a nut operably connected with said worm for movement axially therealong upon rotation of said worm, a rockshaft extending transversely of said worm at one side thereof and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including load-sustaining bearing collar means enclosing in bearing engagement therewith the portion of said set of bearings at the side of said rockshaft remote from said worm, a guide extending loosely around the remaining portion of said set of bearings to guide recirculation of the latter around said rockshaft during said steering operation, and means for holding said guide in position.

5. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including a segmental cylindrical bushing enclosing in bearing engagement therewith the portion of said set of bearings which receives the load imparted by said rockshaft during said steering operation, said supporting structure also including a segmental load sustaining collar around said bushing and reinforcing the same, a guide extending loosely around the remaining portion of said set of bearings to guide recirculation of the latter around said rockshaft during said steering operation, and means for holding said guide in position.

6. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including a segmental cylindrical bushing enclosing in bearing engagement therewith the portion of said set of bearings which receives the load imparted by said rockshaft during said steering operation, said supporting structure also including a segmental load sustaining collar around said bushing and reinforcing the same, a guide extending loosely around the remaining portion of said set of bearings to guide recirculation of the latter around said rockshaft during said steering operation, said guide having diametrically opposed end portions interfitting with mating diametrically opposed end portions of said bushing for securing said guide and bushing together, and means for keying said bushing to said collar to retain the former against rotation relative to the latter.

7. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and a C-shaped spring clip extending around said guide and juxtaposed portions of said collar means to hold said guide in position.

8. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, the opposite ends of said guide abutting said collar means, the latter having recessed portions extending circumferentially of said rockshaft adjacent opposite sides thereof, and a spring clip extending around said guide to hold the same in position, the opposite ends of said clip extending into said recessed portions and clamping said collar means therebetween.

9. In a steering gear, a worm, a nut operably connected with said worm for movement axially therealong upon rotation of said worm, a rockshaft extending transversely of said worm at one side thereof and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including a segmental cylindrical bushing enclosing in bearing engagement therewith the portion of said set of bearings at the side of said rackshaft remote from said worm, said supporting structure also including a segmental load sustaining collar around said bushing and reinforcing the same, a guide extending loosely around the remaining portion of said set of bearings to guide recirculation of the latter around said rockshaft during said steering operation, said guide having diametrically opposed end portions interfitting with mating diametrically opposed end portions of said bushing for securing said guide and bushing together, and means for keying said bushing to said collar to retain the former against rotation relative to the latter.

10. In a steering gear, a worm, a nut operably connected with said worm for movement axially therealong upon rotation of said worm, a rockshaft extending transversely of said worm at one side thereof and having a swinging arm operably connected with said nut for swinging said rockshaft in a steering operation upon said movement of said nut, said rockshaft having a coaxial cylindrical bearing surface thereon at the region of minimum distance between the axes of said rockshaft and worm, a set of needle bearings disposed around said rockshaft, the needle bearings of said set extending axially of said rockshaft in bearing engagement with said bearing surface, a supporting structure including a segmental cylindrical bushing enclosing in bearing engagement therewith the portion of said set of bearings at the side of said rockshaft remote from said worm, a guide extending loosely around the remaining portion of said set of bearings to guide recirculation of the latter around said rockshaft during said steering operation, the opposite ends of said guide abutting said collar means, the latter having recessed portions extending circumferentially of said rockshaft adjacent opposite sides thereof, and a spring clip extending around said guide to hold the same in position, the opposite ends of said clip extending into said recessed portions and clamping said collar means therebetween.

11. In a steering gear, a worm, a nut operably connected with said worm for movement axially therealong upon rotation of said worm, a rockshaft extending transversely of said worm and having a swinging arm operably connected with said nut for swinging said rockshaft in a steering operation upon said movement of said nut, said rockshaft having a bearing surface thereon at the region of minimum distance between said rockshaft and worm, a set of roller bearings disposed around said rockshaft in bearing engagement with said bearing surface, a supporting structure including a housing and a load sustaining bearing collar means, the latter enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position, at least one of the elements of said supporting structure having surface portions inclined with respect to the axis of said rockshaft and engaging the other of said elements to cam said rockshaft toward said worm upon relative axial movement of said rockshaft in one direction.

12. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position.

13. In a steering gear, a worm, a nut operably connected with said worm for movement axially therealong upon rotation of said worm, a rockshaft extending transversely of said worm at one side thereof and having a pair of swinging arms extending radially from said rockshaft at opposite sides of said worm, said arms being operatively connected with said nut at said opposite sides for swinging said rockshaft in a steering operation upon said movement of said nut, said rockshaft having a coaxial cylindrical bearing surface between said arms, a set of needle bearings disposed around said rockshaft and extending axially thereof between said arms in bearing engagement with said bearing surface, a supporting structure including segmental cylindrical load-sustaining bearing collar means enclosing in bearing engagement therewith the portion of said set of bearings at the side of said rockshaft remote from said worm, a segmental cylindrical guide extending loosely around the remaining portion of said set of bearings to guide recirculation of the latter around said rockshaft during said steering operation, and means for holding said guide in position.

14. In a steering gear, a worm, a nut operably connected with said worm for movement axially therealong upon rotation of said worm, a rockshaft extending transversely of said worm at one side thereof and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a coaxial cylindrical bearing surface between said arms, a set of needle bearings disposed around said rockshaft and extending axially thereof between said arms in bearing engagement with said bearing surface, a supporting structure including segmental cylindrical load-sustaining bearing collar means enclosing in bearing engagement therewith the portion of said set of bearings at the side of said rockshaft remote from said worm, a segmental cylindrical guide extending loosely around the remaining portion of said set of bearings to guide recirculation of the latter around said rockshaft during said steering operation, and means for holding said guide in position.

15. The combination according to claim 14 wherein said supporting structure also includes a housing, and at least one of the elements of said supporting structure having surface portions inclined with respect to the axis of said rockshaft and engaging the other of said elements to cam said rockshaft toward said worm to decrease the play between the teeth of said gear racks and sector gears upon relative axial movement of said rockshaft in one direction.

16. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and means for holding said guide in position.

17. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagement with said bearing surface, a supporting structure including a segmental cylindrical bushing enclosing in bearing engagement therewith the portion of said set of bearings which receives the load imparted by said rockshaft during said steering operation, said supporting structure also including a segmental load-sustaining collar around said bushing and reinforcing the same, a segmental cylindrical guide extending loosely around the remaining portion of said set of bearings to guide recirculation of the latter around said rockshaft during said steering operation, and means for holding said guide in position.

18. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, and a C-shaped spring clip extending around said guide and juxtaposed portions of said collar means to hold said guide in position.

19. In a steering gear, a worm, a nut operably connected with said worm for movement axially therealong upon rotation of said worm, a rockshaft extending transversely of said worm and having a pair of swinging arms extending radially from said rockshaft at opposite sides of said worm, said arms being operatively connected with said nut at said opposite sides for swinging said rockshaft in a steering operation upon said movement of said nut, the operative connection between said arms and nut comprising a pair of gear racks carried by said nut at said opposite sides and having gear teeth facing in the direction of said one side, and also comprising a pair of sector gears carried by said arms and meshed with said gear racks respectively, said rockshaft having a bearing surface between said arms, a set of needle bearings disposed around said rockshaft and extending axially thereof between said arms in bearing engagement with said bearing surface, a supporting structure including load-sustaining bearing collar means enclosing in bearing engagement therewith the portion of said set of bearings which receives the load imparted by said rockshaft during said steering operation, a guide extending loosely around the remaining portion of said set of bearings to guide recirculation of the latter around said rockshaft during said steering operation, the opposite ends of said guide abutting said collar means, the latter having recessed portions extending circumferentially of said rockshaft adjacent opposite sides thereof, and a spring clip extending around said guide to hold the same in position, the opposite ends of said clip extending into said recessed portions and clamping said collar means therebetween.

References Cited in the file of this patent

FOREIGN PATENTS 765,014    France _____ June 1, 1934